No. 886,005. PATENTED APR. 28, 1908.
F. K. LATHROP.
CORN PLANTER.
APPLICATION FILED DEC. 18, 1905.

2 SHEETS—SHEET 1.

Witnesses
Q. P. Hargill,
Glena Pritchard

Inventor
Frank K. Lathrop
by Alfred M. Allen
Attorney

No. 886,005. PATENTED APR. 28, 1908.
F. K. LATHROP.
CORN PLANTER.
APPLICATION FILED DEC. 18, 1905.

2 SHEETS—SHEET 2.

Witnesses
R. P. Hazlitt,
Glena Pritchard

Inventor:
Frank K. Lathrop
by Alfred M. Allen
Attorney

UNITED STATES PATENT OFFICE.

FRANK K. LATHROP, OF DAYTON, OHIO, ASSIGNOR TO OHIO RAKE COMPANY, OF DAYTON, OHIO, A CORPORATION OF OHIO.

CORN-PLANTER.

No. 886,005.  Specification of Letters Patent.  Patented April 28, 1908.

Application filed December 18, 1905. Serial No. 292,266.

*To all whom it may concern:*

Be it known that I, FRANK K. LATHROP, a citizen of the United States, residing in Dayton, county of Montgomery, and State of Ohio, have invented certain new and useful Improvements in Corn-Planters, of which the following is a full, clear, and exact description, reference being had to the accompanying drawings, forming part of this specification.

My invention relates to improvements in the seeding mechanism of corn planters.

The principal object of my invention is to provide mechanism whereby the seed may be effectively and accurately delivered on edge to the seed cups of the seed disk or ring to be carried by the seed disk or ring one seed on edge in each cup to the discharge orifice of the hopper. The advantage of delivering the corn on edge is that while kernels of corn from different ears and from different parts of the same ear, will vary considerably in length and width, they are all of substantially the same thickness, so that the seed cups can be made of a width to hold one and only one grain on edge at a time. If, therefore, the grain can be forced to take an edge position, and can be properly delivered to the seed cups, each cup can be forced to carry but a single grain, and there will practically be no liability of the grain jamming in the cups to be cracked or broken in the delivery therefrom.

My invention, therefore, consists of various novel features of construction in the seeding devices to be hereinafter particularly pointed out and claimed, whereby this edge delivery of the kernels of corn is enforced and maintained, and each seed cup permitted to carry but a single grain to the delivery orifice.

Figure 1:
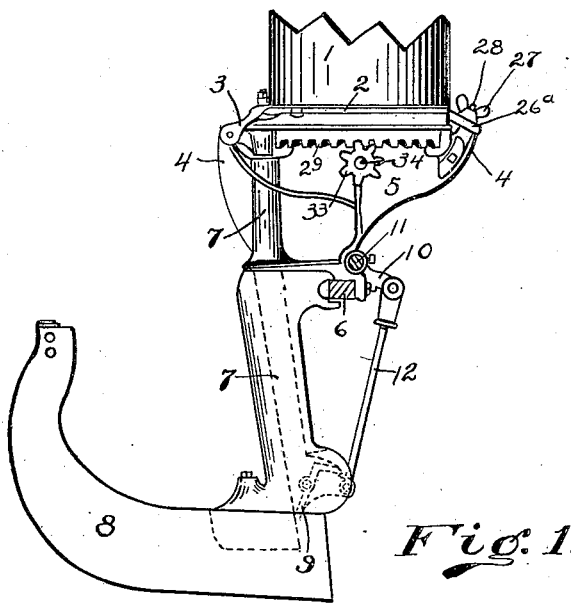
Figure 2:
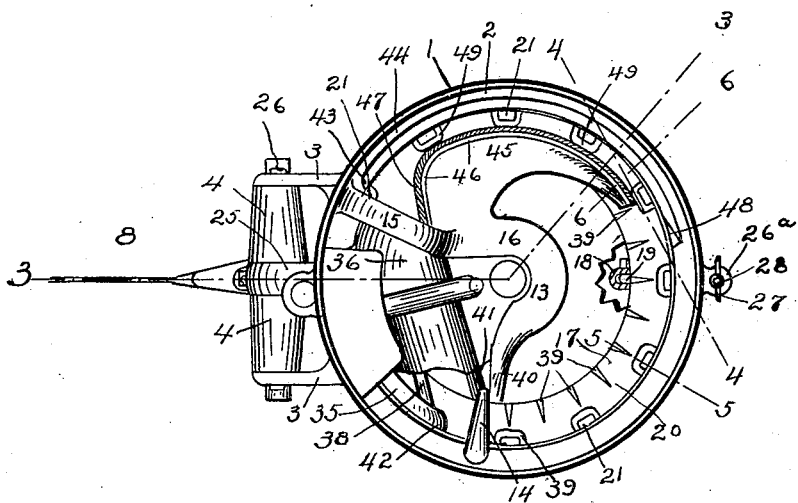
Figure 3:
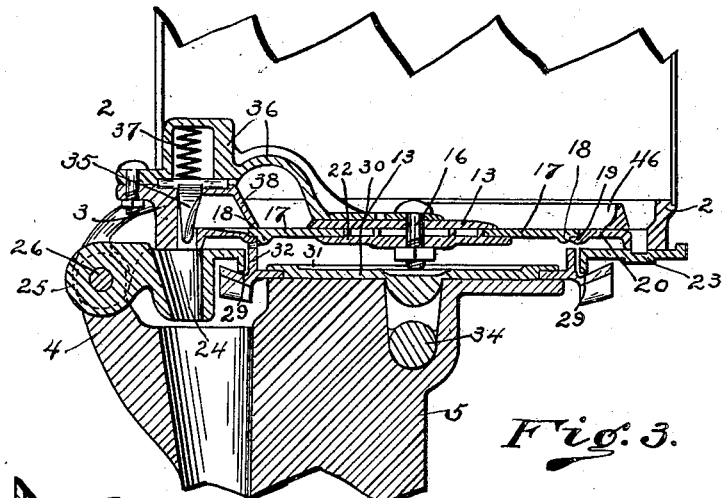
Figure 4:
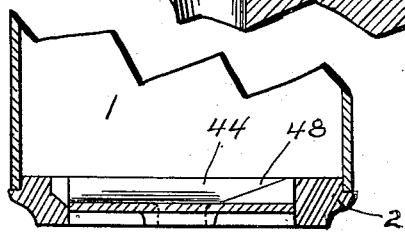
Figure 6:
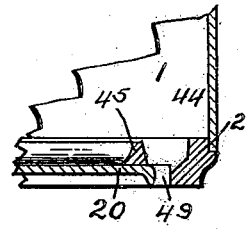
Figure 5:
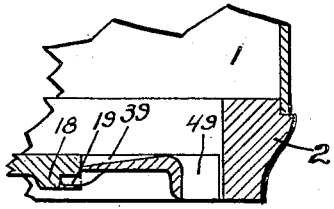
Figure 7:
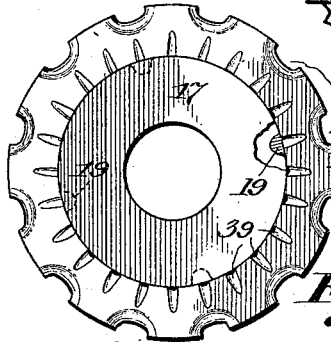
Figure 8:
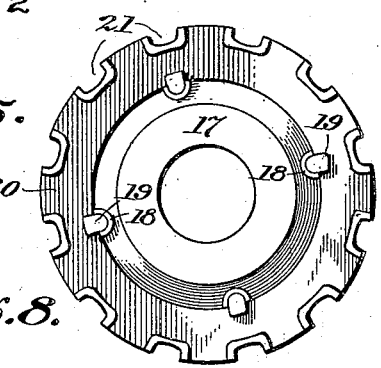

In the drawings Figure 1 is a side elevation of the seed hopper, conducting tube and runner, or furrow opener of the planter. Fig. 2 is a plan of same. Fig. 3 is a central vertical section taken on the lines 3—3 of Fig. 2. Fig. 4 is a detail vertical section taken on the lines 4—4 of Fig. 2. Fig. 5 is a detail section taken on the lines 5—5 of Fig. 2. Fig. 6 is a similar section taken on the lines 6—6 of Fig. 2. Fig. 7 is a view of the seed ring construction with the central portions removed. Fig. 8 is an inverted view of the seed ring and the disk by which the seed ring is carried.

1 is the seed hopper which is mounted on, and suitably secured to the rim or base 2, which rim is pivoted by the lugs 3—3 on a side extension 4 from the casting 5, which is bolted on the cross beam 6 of the planter frame. This casting 5 carries the conducting tube 7, through which the grains of corn are delivered at the rear of the furrow opener 8. This conducting tube is provided at the bottom with the usual valve 9 operated by the arm 10 on the shaft 11, the arm 10 being connected with the valve by the connecting rod 12.

The rim 2 is provided with a central plate 13 connected by the arches 14—15, and journaled by the bolt 16 to the central portion 13 is a disk 17, which disk is provided on the under face of its periphery with recesses 18, in which engage the lugs 19 on the seed ring 20. This seed ring 20 is provided with a series of oblong notches, or openings 21 of a size sufficient to hold and allow the passage of a single kernel of corn edgewise. The disk 17 is held in place on the central portion of the rim piece by the washer 22, and this plate 17 carries the seed ring 20. The seed ring rests on the annular plate 23, to which the rim 2 is bolted, and this annular plate 23 is provided with a discharge orifice 24 located over the mouth of the conducting tube. The annular plate 23 is hinged by a lug 25 on the same pin 26 by which the rim 2 is hinged to the casting 4, so that when the rim and the annular plate 23 are bolted together, they will turn back together. These two parts will carry between them the rotating plate 17, and its seed ring 20. The rim 2 carries the slotted lug 26ª for holding in position the various parts by the thumb nut 27, which engages the bolt 28 pivoted on the casting 5.

29 is the gear ring, which is mounted on the central plate 30 on the upper end of the casting 5, and held in position by the flanged plate 31. This gear ring has vertically extending lugs 32, which engage the lugs 18 on the under surface of the plate 17, so that as the gear ring is rotated the plate 17 and its seed ring 20 will be rotated therewith. This gear ring 29 is driven by the usual pinion 33 on the operating or seed shaft 34.

Mounted on a raised portion of the rim 2 over the orifice 24 on the plate 23 is the usual pivoted cut off 35 for removing the surplus grain as it is carried by the seed cups into the discharge orifice 24, and thence into the conducting tube 7.

36 is the usual cover for this cut off, and the usual coiled spring 37 is employed bearing on the cut off to insure its proper action. The cover 36 also forms in connection with the inclined side 38 of the rim plate, and the seed plate 17, an arched passageway for the corn.

As heretofore stated, the special object of my present invention is to insure the delivery of the kernels of corn on edge into the seed cups of the seed ring, and the arched passageway under the cover 36 is designed to bring about as far as possible an edge position for the kernels of corn. The seed plate and seed ring is rotated from left to right, and the seed ring is provided with radial grooves 39 to carry the corn towards this passageway. The side edge 40 of the portion of the plate 13 is beveled, and inclined, as shown in Fig. 2, to have a tendency to carry the kernels of corn underneath the arch 14, and the opposite side 41 of this same extension piece is beveled in the opposite direction, so that in connection with the inclined edge 42 of the cut off 35 and the inclined wall 38 of the rim, the tendency will be to mass the kernels of corn as they enter the arched passageway under the plate 36 on edge, the grooves 39 in the seed ring enforcing the movement of the corn against this inclined wall 38.

As the corn is pushed through the passageway, it is carried towards the rim 2, and this rim is recessed, commencing at the end of the passageway at 43 with an inclined face 44 at the bottom, so that the tendency is to cause the kernels of corn to slide into the seed cups 21, as they advance from under the cut off on edge. This beveled edge of the rim is also depressed slightly below the surface of the seed ring, which still further insures the grain of corn entering on edge into the seed cup. In order to form a passageway, the plate 13 is provided with a segmental portion 45 which has a raised edge 46 concentric with the rim, and this raised edge is provided with a downwardly sloping wall 47 on the inside to further assist in the delivery of the corn on edge. The recessed and beveled out portion of the rim is extended over about one-third of the perimeter, and at its outer or delivery end and slightly beyond the end of the segmental portion 45 of the plate 13 this recessed portion ends in an inclined upward portion 48. The result of this is that should it happen that two or more grains of corn become deposited in the seed cup, the extra grains will be brushed off as they come in contact with this raised portion 48. The passageway into the seed cups 21 is also beveled towards the opening on the three sides, as shown at 49. It will, therefore, be understood that with all these various features of construction, the kernels of corn will be uniformly fed on edge, so that one kernel at a time will be carried on edge by the seed ring 20 to the discharge orifice 24 of the hopper. The arched passageway covered by the arch 36, which extends from the central plate to the cut off blocks prevents the weight of the corn in the hopper from having undue pressure on the grains of corn at the bottom, and as stated, the passageway is so constructed that the corn which is delivered therethrough thus relieved from the weight of the corn in the hopper shall take the edge position.

Having thus described my invention, what I claim as new and desire to secure by Letters Patent, is:

1. In a corn planter, a seed plate, provided with elongated seed cups to receive the seed on edge, and a rim plate coöperating therewith, having its contiguous side wall recessed and beveled towards the seed plate with a guard plate coöperating with the rim to form a channel to an edge slightly below the upper surface of the seed plate, to cause the grain to take an edge position over the seed plate.

2. In a corn planter, a seed plate, provided with elongated seed cups to receive the seed on edge, and a rim plate coöperating therewith, having its contiguous side wall recessed and beveled towards the seed plate to an edge slightly below the upper surface of the seed plate, with a guard plate concentric with said recessed rim to form a channel for the grain narrower at the bottom than at the top for the purpose set forth.

3. In a corn planter, a seed plate provided with elongated seed cups to receive the seed on edge, a discharge orifice for the seed cups, an arched passageway with downwardly beveled walls, contiguous to said discharge orifice to carry the grain in an edge position to a point immediately beyond the discharge orifice for delivery on edge to the seed cups, for the purpose set forth.

4. In a corn planter, a seed plate provided with elongated seed cups to receive the seed on edge, a discharge orifice for the seed cups, an arched passageway with downwardly beveled walls, contiguous to said discharge orifice to carry the grain in an edge position to a point immediately beyond the discharge orifice for delivery on edge to the seed cups, and a rim plate coöperating with the seed plate and having its contiguous side wall recessed and beveled towards the seed plate opposite said arched passageway, for the purpose set forth.

5. In a corn planter, a seed plate provided with elongated seed cups to receive the seed on edge, a discharge orifice for the seed cups, an arched passage-way with downwardly beveled walls, contiguous to said discharge orifice to carry the grain in an edge position to a point immediately beyond the discharge orifice for delivery on edge to the seed cups, and a rim plate coöperating with the seed plate, and having its contiguous side wall recessed and beveled towards the seed plate opposite said arched passage-way, with a guard plate concentric with said recessed rim to form a channel for the grain narrower at the bottom than at the top for the purpose set forth.

6. In a corn planter, a seed plate provided with elongated seed cups to receive the seed on edge, a discharge orifice for the seed cups, an arched passageway with downwardly beveled walls, contiguous to said discharge orifice, to carry the grain in an edge position to a point immediately beyond the discharge orifice for delivery on edge to the seed cups, said seed plate being provided with radial grooves to carry the grain into said arched passageway.

7. In a corn planter, a seed plate, provided with elongated seed cups to receive the seed on edge, and a rim plate coöperating therewith, having its contiguous side wall recessed and beveled towards the seed plate, with a guard plate concentric with said recessed rim to form a channel for the grain narrower at the bottom than at the top, said recessed portion of the rim ending with a sharp upwardly inclined surface, to dislodge any surplus grains from the seed cups.

8. In a corn planter, a seed plate provided with elongated seed cups to receive the seed on edge, a discharge orifice for the seed cups, an arched passageway with downwardly beveled walls, contiguous to said discharge orifice to carry the grain in an edge position to a point immediately beyond the discharge orifice for delivery on edge to the seed cups, said seed plate being provided with radial grooves to carry the grain into said arched passageway, and a guard plate with an arch at the entrance to said arched passageway, to permit entrance for only a limited quantity of grain for the purpose set forth.

FRANK K. LATHROP.

Witnesses:
E. J. FINKE,
MAY B. MATHER.